(12) United States Patent
Takeuchi et al.

(10) Patent No.: US 7,218,315 B2
(45) Date of Patent: May 15, 2007

(54) DISPLAY DEVICE, ELECTRONIC APPLIANCE AND CAMERA

(75) Inventors: Tsuneo Takeuchi, Kashihara (JP); Yuji Sato, Tenri (JP); Kazuo Maeyama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 361 days.

(21) Appl. No.: 10/366,325

(22) Filed: Feb. 14, 2003

(65) Prior Publication Data

US 2003/0151600 A1  Aug. 14, 2003

(30) Foreign Application Priority Data

Feb. 14, 2002  (JP)  ............... 2002-036885
Feb. 14, 2002  (JP)  ............... 2002-036886
Apr. 3, 2002  (JP)  ............... 2002-101702

(51) Int. Cl.
G09G 5/00  (2006.01)

(52) U.S. Cl. ............. 345/204; 345/205; 345/206; 345/211; 345/1.1; 345/2.1

(58) Field of Classification Search ........... 345/204, 345/205, 206, 211, 1.1, 2.1
See application file for complete search history.

(56) References Cited

U.S. PATENT DOCUMENTS

| | | | | |
|---|---|---|---|---|
| 5,299,265 A | * | 3/1994 | Hayama et al. ............ 381/86 |
| 5,517,345 A | * | 5/1996 | Joaille ..................... 398/112 |
| 6,011,293 A | * | 1/2000 | Yuzuriha et al. ........... 257/380 |
| 6,115,618 A | * | 9/2000 | Lebby et al. ............... 455/566 |
| 6,295,139 B1 | | 9/2001 | Yamauchi et al. | |
| 6,445,417 B1 | * | 9/2002 | Yoshida et al. ............. 348/374 |
| 6,643,715 B1 | * | 11/2003 | Arthur ....................... 710/14 |
| 6,738,805 B2 | * | 5/2004 | Negishi ..................... 709/219 |
| 6,787,775 B1 | * | 9/2004 | Bielefeld et al. ........... 250/330 |
| 2001/0012651 A1 | * | 8/2001 | Yamazaki et al. .......... 438/166 |
| 2003/0112403 A1 | * | 6/2003 | Ino .......................... 349/152 |

FOREIGN PATENT DOCUMENTS

| | | | |
|---|---|---|---|
| CA | 2 353 163 A1 | | 1/2002 |
| JP | 61-163371 | | 7/1986 |
| JP | 63-79159 | | 4/1988 |
| JP | 8-102924 | | 4/1996 |
| JP | 08-205016 A | | 8/1996 |
| JP | 8-304759 | | 11/1996 |
| JP | 10-115816 | | 5/1998 |
| JP | 11-27471 | | 1/1999 |
| JP | 11-295086 | * | 10/1999 |
| JP | 2000-305065 | * | 2/2000 |
| JP | 2001-94109 | | 4/2001 |
| JP | 2001-143033 | | 5/2001 |
| JP | 2001-188502 A | | 7/2001 |
| JP | 2001229944 A | * | 8/2001 |
| KR | 2001-2185 | | 1/2001 |

* cited by examiner

Primary Examiner—Richard Hjerpe
Assistant Examiner—Leonid Shapiro
(74) Attorney, Agent, or Firm—Birch, Stewart, Kolasch & Birch, LLP

(57) ABSTRACT

A display device, which defines an attached state or a removed state with respect to an electronic appliance, includes a display section, a driver for driving the display section, a transceiver for transmitting or receiving a signal to/from the electronic appliance, and a system controller for controlling the driver and the transceiver. At least portion of the transceiver and at least portion of the system controller are integrated together with the display section and the driver on the same substrate.

24 Claims, 15 Drawing Sheets

DISPLAY DEVICE, ELECTRONIC APPLIANCE AND CAMERA

BACKGROUND OF THE INVENTION

1. Field of the Invention

The present invention relates to a display device and an electronic appliance such as a camera.

2. Description of the Related Art

Various types of flat-panel displays (FPDs) with a shallow physical depth, including liquid crystal displays and organic EL displays, have recently been increasingly popularized. FPDs have now found applications particularly frequently in personal computers, personal digital assistants (PDAs) and cell phones among other things.

Meanwhile, the "intelligence", i.e., the level of digital information processibility, of household electronic appliances has also been raised day after day by recent extensive research and development of digital information processing technologies. As a result, not just TVs and cameras (including digital still cameras and camcorders) but an increasing number of microwave ovens and refrigerators are now equipped with digital information processibility.

Taking these circumstances into account, the "display device" now should be regarded as playing an important role of interfacing human users with numerous types of machines surrounding them as well as the traditional role of outputting or presenting information thereon.

Conventional electronic appliances, however, have their own display devices, none of which is normally removable from its parent appliance or compatible with any other appliance.

SUMMARY OF THE INVENTION

In order to overcome the problems described above, preferred embodiments of the present invention provide a display device that can be selectively connected to, and add display capabilities to, any electronic appliance on demand of the user and also provide an electronic appliance compatible with such a display device.

A display device according to a preferred embodiment of the present invention defines an attached state or a removed state with respect to an electronic appliance. The display device preferably includes a display section, a driver for driving the display section, a transceiver for transmitting or receiving a signal to/from the electronic appliance, and a system controller for controlling the driver and the transceiver. At least portion of the transceiver and at least portion of the system controller are preferably integrated together with the display section and the driver on the same substrate.

In one preferred embodiment of the present invention, the display device is preferably substantially in the shape of a rectangle in a plan view. In that case, a portion of the display device, including one side of the rectangle, is inserted into a member of the electronic appliance that receives the display device in a removable state.

In another preferred embodiment, the display device preferably further includes a power supply and has the ability to conduct a display operation by itself even when the display device is in the removed state with respect to the electronic appliance.

In this particular preferred embodiment, the power supply may be attachable to, and removable from, the display device.

Alternatively, the power supply may include a solar battery.

As another alternative, the power supply may include a fuel battery.

As another alternative, power may be supplied to the power supply by electromagnetic induction while the display device is in the attached state with respect to the electronic appliance.

In still another preferred embodiment, the display device may further include a memory.

In that case, the memory is preferably attachable to, and removable from, the display device.

In yet another preferred embodiment, the display device may further include an imager.

In yet another preferred embodiment, the display device may further include an input circuit, which generates an instruction signal in response to user's operation.

In this particular preferred embodiment, the display device preferably further includes an input section, through which a command is input by user's manipulation.

In a specific preferred embodiment, the input section is preferably provided either on a surface of the display device so as to face a screen of the display section or on a side surface of the display device so as to cross the screen.

Specifically, the input section preferably includes a jog dial.

In yet another preferred embodiment, the display device may further include at least one circuit that is selected from the group consisting of a memory, an input circuit, and an imager. In that case, a portion of the at least one circuit is preferably integrated together with the other circuits on the substrate.

In yet another preferred embodiment, the at least portion of the transceiver and the at least portion of the system controller preferably each include a circuit component that is made of the same film as a circuit component of the display section or the driver.

In a specific preferred embodiment, the same film is preferably a continuous grain silicon film.

In yet another preferred embodiment, in the attached state, the display device preferably transmits or receives the signal to/from the electronic appliance by a non-contact method.

In yet another preferred embodiment, the display device may transmit or receive the signal to/from the electronic appliance by a radio communication technique.

Alternatively, the display device may transmit or receive the signal to/from the electronic appliance by an optical communication technique. Optionally, the radio communication and optical communication may be used in combination.

In this particular preferred embodiment, the optical communication is preferably carried out by an element that is provided on the substrate so as to propagate an optical signal vertically to the substrate.

In yet another preferred embodiment, the display device may have the ability to switch communications modes of transmitting or receiving the signal to/from the electronic appliance depending on whether the display device defines the attached state or the removed state with respect to the electronic appliance.

In this particular preferred embodiment, switching of the communication modes may include switching between an optical communication mode and a radio communication mode.

Alternatively, switching of the communication modes may include changing output levels of the signal to be exchanged.

In yet another preferred embodiment, the display device may have the ability to transmit a signal that controls some functions of the electronic appliance.

An electronic appliance according to another preferred embodiment of the present invention preferably includes: a member for receiving the display device according to any of the preferred embodiments described above in a removable state; and a transceiver to transmit or receive a signal to/from the display device.

In one preferred embodiment of the present invention, the electronic appliance may be a personal digital assistant.

In another preferred embodiment, the electronic appliance may be a display system.

A camera according to another preferred embodiment of the present invention preferably includes an imaging optical system, an image information generator, a first transceiver, a first system controller, a housing, and a card-type display device. The image information generator preferably generates image information based on optical information obtained from the imaging optical system. The first transceiver preferably generates and outputs a display signal in accordance with the image information that has been generated by the image information generator. The first system controller preferably controls the imaging optical system, the image information generator and the first transceiver. The housing is preferably used to store the imaging optical system, the image information generator, the first transceiver and the first system controller therein. The card-type display device is fitted into, but removable from, the housing. The card-type display device preferably includes: a display section; a second transceiver for transmitting or receiving a signal to/from the first transceiver; a driver for driving the display section in response to the display signal; and a second system controller for controlling the second transceiver and the driver.

In one preferred embodiment of the present invention, at least portion of the second transceiver and at least portion of the second system controller are preferably integrated together with the display section and the driver on the same substrate.

In another preferred embodiment, the card-type display device is preferably fitted into the housing so as not to exceed the width of the housing.

In still another preferred embodiment, the card-type display device may further include a power supply and may have the ability to conduct a display operation by itself even when the display device is out of contact with the housing.

In this particular preferred embodiment, the power supply may be attachable to, and removable from, the display device.

Alternatively, the power supply may include a solar battery.

As another alternative, power may be supplied to the power supply of the card-type display device by electromagnetic induction while the display device is in contact with the housing.

In yet another preferred embodiment, the card-type display device may further include a memory.

In that case, the memory is preferably attachable to, and removable from, the card-type display device.

In yet another preferred embodiment, the card-type display device may further include an imager.

In yet another preferred embodiment, the card-type display device may further include an input circuit, which generates an instruction signal in response to user's operation.

In this particular preferred embodiment, the card-type display device preferably further includes an input section, through which a command is input by user's manipulation.

In a specific preferred embodiment, the input section is preferably provided either on a surface of the display device so as to face a screen of the display section or on a side surface of the display device so as to cross the screen.

In yet another preferred embodiment, the card-type display device may further include at least one circuit that is selected from the group consisting of a memory, an input circuit, and an imager. In that case, a portion of the at least one circuit is preferably integrated together with the other circuits on the substrate.

In yet another preferred embodiment, the at least portion of the second transceiver and the at least portion of the second system controller preferably each include a circuit component that is made of the same film as a circuit component of the display section or the driver.

In a specific preferred embodiment, the same film is preferably a continuous grain silicon film.

In yet another preferred embodiment, while fitted in the housing, the card-type display device preferably transmits or receives the signal to/from the first transceiver by a non-contact method.

In yet another preferred embodiment, the card-type display device may transmit or receive the signal to/from the first transceiver by a radio communication technique.

In an alternative preferred embodiment, the card-type display device may transmit or receive the signal to/from the first transceiver by an optical communication technique. Optionally, the radio communication and the optical communication may be used in combination.

In this particular preferred embodiment, the optical communication is preferably carried out by an element that is provided on the substrate so as to propagate an optical signal vertically to the substrate.

In yet another preferred embodiment, the card-type display device may have the ability to transmit a signal that controls some functions of the first system controller.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, specific embodiments of a display device according to the present invention and electronic appliances, to which the display device is selectively connected, will be described with reference to the accompanying drawings.

A display device according to any of the following preferred embodiments of the present invention defines an attached state or a removed state with respect to an electronic appliance. The display devices of the following specific preferred embodiments are supposed to have a card shape such that the display devices can be readily inserted into, and removed from, the electronic appliance and/or can be carried about anytime. It should be noted, however, that the display devices may also have any of various other shapes or screen sizes as long as the devices can be inserted into, and removed from, the electronic appliances.

As used herein, the "attached/removed" state refers to a state of the card-type display device to be chosen by the user on the spot. Specifically, the "attached state" herein refers to a situation where the card-type display device is attached to a predetermined position (e.g., a slot) of the electronic appliance and may be used along with the electronic appliance. On the other hand, the "removed state" herein refers to a situation where the card-type display device is detached or removed from the electronic appliance and can be carried about or used by itself.

Figure 1A:
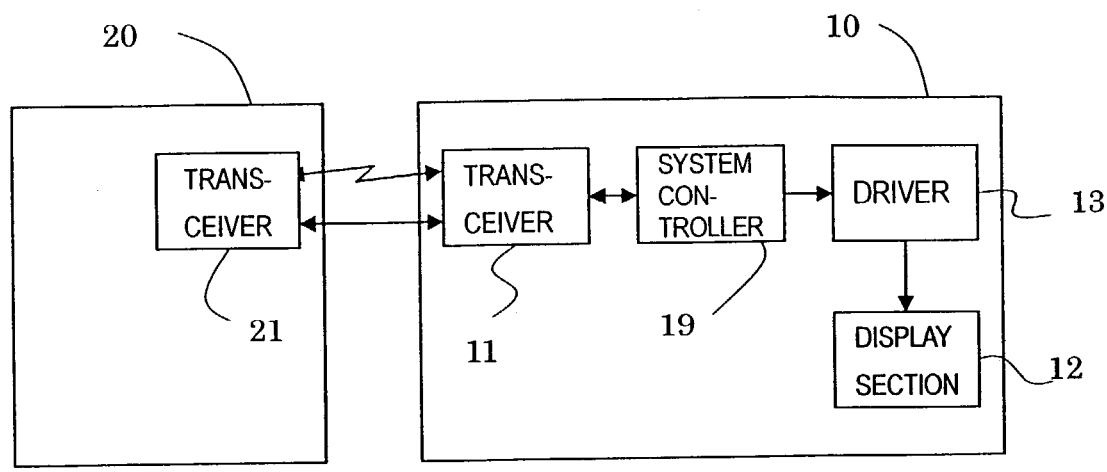
FIG. 1A is a block diagram schematically showing a state where a card-type display device 10 according to a preferred embodiment of the present invention is fitted in an electronic appliance 20.
Figure 1B:
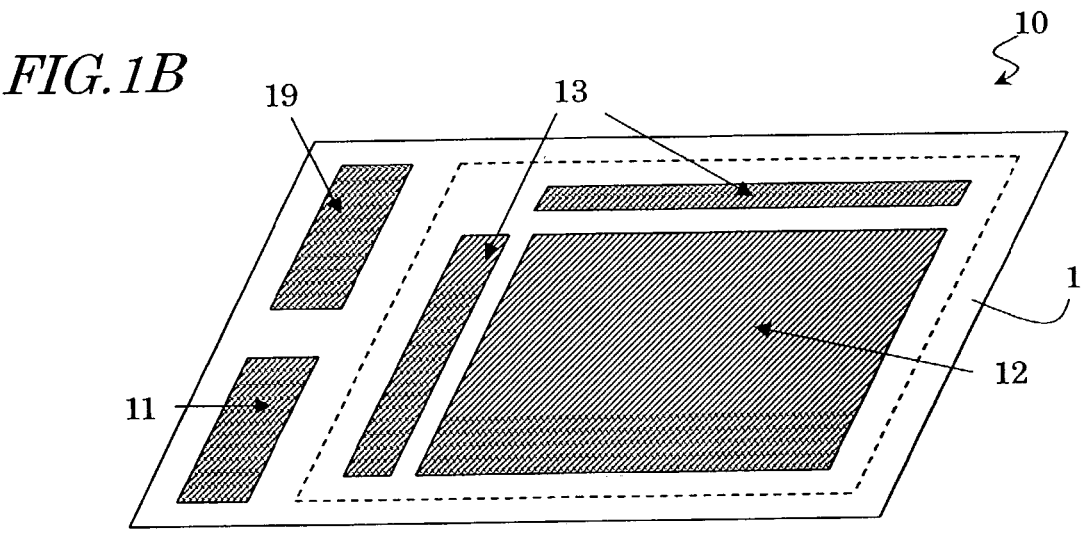
FIG. 1B schematically illustrates an exemplary layout for the card-type display device 10.

A card-type display device 10 according to a specific embodiment of the present invention and an electronic appliance 20, to which the display device 10 is inserted, will be described with reference to FIGS. 1A and 1B. FIG. 1A is a block diagram schematically showing a state where the card-type display device 10 is in contact with the electronic appliance 20. FIG. 1B schematically illustrates an exemplary layout for the card-type display device 10. In FIG. 1A, the arrows indicate main signal propagation paths.

As shown in FIGS. 1A and 1B, the card-type display device 10 includes a display section 12, a driver 13 to drive the display section 12, a transceiver 11 to transmit or receive a signal to/from the electronic appliance 20, and a system controller 19 to control the driver 13 and transceiver 11. At least portion of the transceiver 11 and at least portion of the system controller 19 are located on the same substrate 1 as the display section 12 and driver 13. In the preferred embodiment illustrated in FIG. 1B, the transceiver 11 and system controller 19 are integrated together with the display section 12 and driver 13 on the same substrate 1. It should be noted, however, that the present invention is not limited to this specific preferred embodiment. Rather, some components of these circuits may be mounted by a method such as chip on glass (COG) technique, for example. The card-type display device 10 typically further includes a housing (not shown), which is used as a protective casing to store the substrate 1 and/or other components of the display device 10.

The electronic appliance 20 includes a housing (not shown), into which the card-type display device 10 is fitted, and a transceiver 21 to transmit or receive a signal to/from the transceiver 11 of the card-type display device 10. Although not mentioned or shown specifically herein, the electronic appliance 20 naturally includes circuits and other components that are needed to perform its intended function. The electronic appliance 20 may be a camera of any of various types including digital still cameras and camcorders, a TV, a PC, a PDA, a cell phone, a game appliance, a car navigator or any other consumer electronic appliance with information processing capability.

The card-type display device 10 typically has a substantially rectangular shape as shown in FIG. 1B and may have approximate dimensions of 85.6 mm×54.0 mm and a thickness of about 3 mm to about 10 mm, for example.

Figure 2:
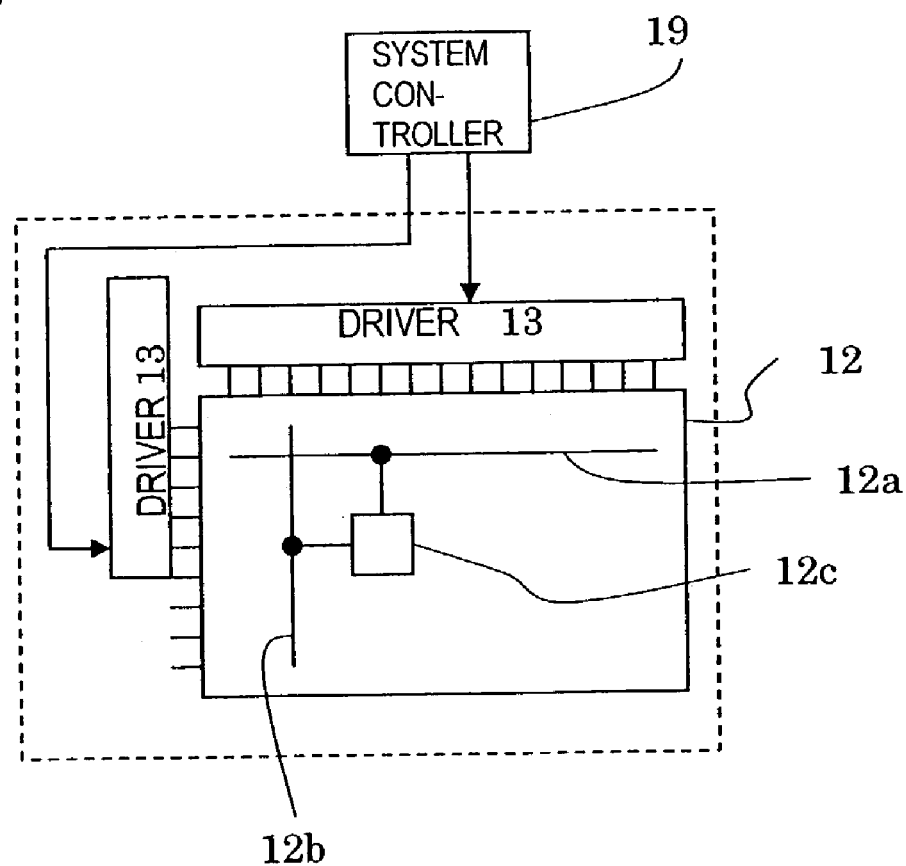
FIG. 2 schematically shows a configuration for the display section 12 of the card-type display device 10 shown in FIGS. 1A and 1B.

The display section 12 and the driver 13 to drive the display section 12 may make up a known active-matrixaddressed liquid crystal display, for example. In this preferred embodiment, a liquid crystal display panel is used as the display section 12. As schematically shown in FIG. 2, such a display section 12 includes: gate lines 12a and source lines 12b; TFTs, each of which has its ON/OFF states controlled by associated one of the gate lines 12a; and pixel electrodes, each of which is connected to associated one of the source lines 12b by way of associated one of the TFTs. The gate lines 12a, source lines 12b, TFTs and pixel electrodes are provided on the principal surface of the substrate 1. Each pair of TFT and pixel electrode will be referred to herein as a "display pixel" 12c. Although not shown in FIG. 2, the display section 12 further includes: a counter substrate with a counter electrode that is disposed to face the pixel electrodes; and a liquid crystal layer sandwiched between the substrate 1 and the counter substrate. The driver 13 includes a gate line driver and a source line driver. If necessary, the counter substrate may include a color filter layer so as to allow the display section 12 to conduct a display operation in full colors. To cut down the power dissipation, the display section 12 is preferably either a reflective liquid crystal display or a reflective and transmissive liquid crystal display.

Alternatively, the display section 12 may also be an organic EL display or an electrophoretic display, for example. The switching elements (or active components) do not have to be the TFTs, either. The driver 13 may be made by a known technique in accordance with the configuration of the display section 12. In the following illustrative preferred embodiment, however, the display section 12 is supposed to include TFTs as the switching elements.

The substrate 1 may be a glass substrate, for example. On the substrate 1, the TFTs, electrodes and lines of the display section 12 are formed by known techniques. The semiconductor film included in the TFTs is preferably made of a semiconductor material with a high mobility such as polysilicon. Then, some circuit components of the transceiver 11 and system controller 19 may be made of the same semiconductor film as those of the driver 13. If portion of the transceiver 11, portion of the system controller 19, the display section 12 and the driver 13 are integrated together on the same substrate 1, then the size and thickness of the card-type display device 10 can be reduced. A continuous grain silicon film as disclosed in Japanese Laid-Open Publication No. 2001-94109 may be used as a semiconductor film having an even higher mobility. By using the continuous grain silicon film, the size, thickness and power dissipation of the display device 10 can be further reduced, the manufacturing process thereof can be simplified, and the manufacturing cost thereof can be cut down.

In view of the characteristics of the semiconductor film formed on the substrate or cost performance, that portion of the transceiver 11 and that portion of the system controller 19 may be ready-made circuit components, which may be mounted on the substrate 1 by a known technique such as COG. Also, as will be described later, not just these circuits 11, 12, 13 and 19 but other additional circuits, including a power supply, a memory and an imager, may be further integrated together or mounted on the substrate 1.

In a currently available display device, the area of the display section 12 normally accounts for approximately 60% of the overall area of the display device and the picture frame area thereof, surrounding the display section 12, usually has a width of about 2.5 mm to about 3.0 mm. However, by integrating at least portion of the transceiver 11 and at least portion of the system controller 19 together with the display section 12 and driver 13 on the same substrate 1, the area of the display section 12 can be increased to about 70% or more of the overall area and the width of the picture frame area can be decreased to about 2 mm or less.

The card-type display device 10 having such a configuration is characterized by its reduced size or thickness and decreased power dissipation. In addition, the card-type display device 10 may be selectively connected to the electronic appliance 20 on demand of the user so as to provide display capabilities for the appliance or add supplementary display function thereto if the electronic appliance 20 has its own display device. The information to be presented on the card-type display device 10 may be provided from the transceiver 21 of the electronic appliance 20 by way of the transceiver 11. The card-type display device 10 may be fitted into not only a particular electronic appliance 20 but also any of various other types of electronic appliances having a common I/O interface. Thus, the card-type display device 10 can conduct a display operation in a specific mode to be determined by the electronic appliance to which the display device 10 has been inserted. For example, even if the electronic appliance 20 to which the card-type display device 10 is normally connected is a camera, the card-type display device 10 may also be inserted into a TV, a PC, a PDA or a cell phone to conduct a display operation in any mode to be determined by that electronic appliance.

The electronic appliance 20 may include a slot as a member (not shown) to receive a portion of the substantially rectangular card-type display device 10 (as schematically shown in FIG. 1B) in a removable state. The portion to be received by the slot includes one side (e.g., a shorter side) of the card-type display device 10. That is to say, when the card-type display device 10 is inserted into the slot, a signal is exchanged between the transceivers 11 and 21 of the card-type display device 10 and electronic appliance 20. In the preferred embodiment illustrated in FIG. 1A, the signal travels bidirectionally between the transceivers 11 and 21. However, depending on the specific application, the signal does not have to go back and forth between the two transceivers 11 and 21. For example, after the electronic appliance 20 has sensed the insertion of the card-type display device 10 into the slot, the electronic appliance 20 may supply display signals and required power to the card-type display device 10.

When the electronic appliance 20 is provided with such a slot to receive a portion of the card-type display device 10 in a removable state, no special connector is needed, and the user can handle the electronic appliance 20 more easily.

Figure 3A:
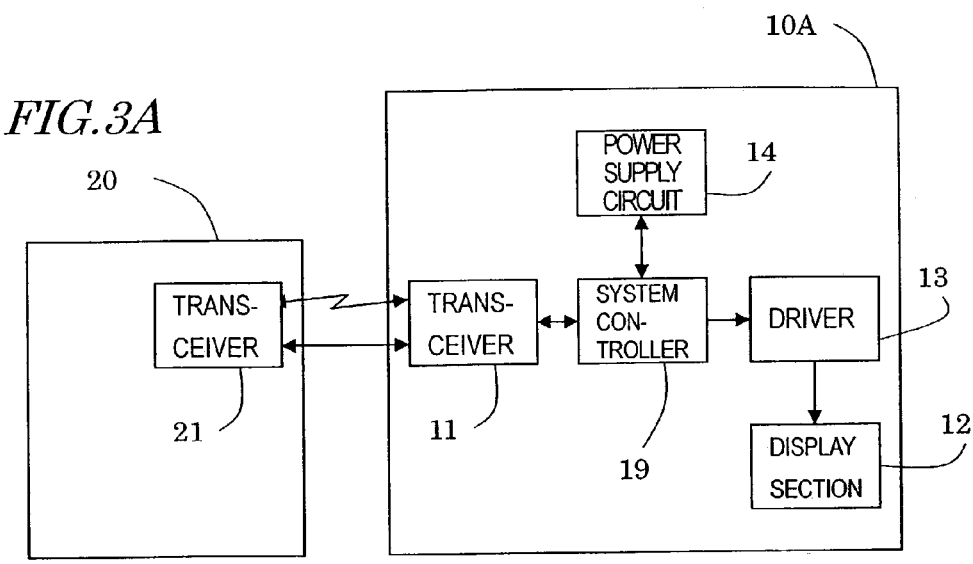
FIG. 3A is a block diagram schematically showing a state where a card-type display device 10A according to another preferred embodiment of the present invention is fitted in the electronic appliance 20.
Figure 3B:
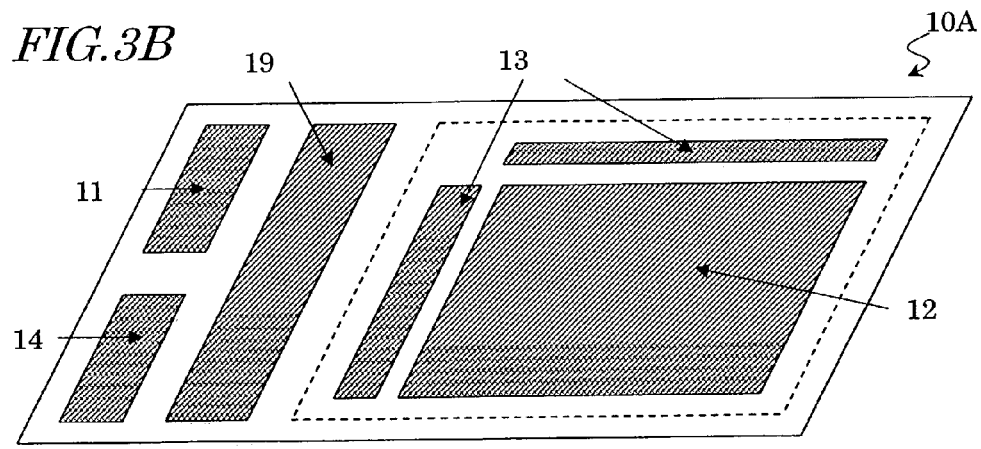
FIGS. 3B and 3C schematically illustrate exemplary layouts for the card-type display device 10A.
Figure 3C:
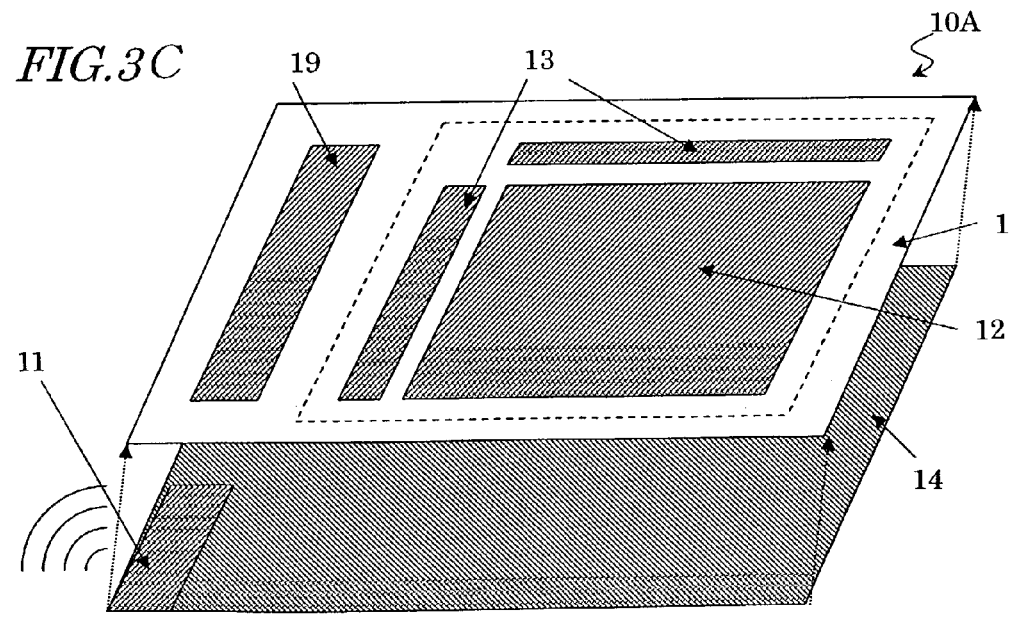

Hereinafter, a card-type display device 10A according to another specific embodiment of the present invention will be described with reference to FIGS. 3A through 3C. As schematically shown in FIGS. 3A through 3C, the card-type display device 10A further includes a power supply circuit 14 in addition to all components of the card-type display device 10 shown in FIGS. 1A and 1B.

The power supply circuit 14 may function as a power supply by itself or convert and/or control a voltage, supplied from a separately provided power supply, to a predetermined voltage. Either portion or all of the power supply circuit 14 may be integrated together with the other circuits 11, 12, 13 and 19 on the same substrate 1. For example, where a solar battery is used as the power supply circuit 14, the solar battery may be integrated together with the other circuits on the substrate 1 by adopting the configuration disclosed in Japanese Laid-Open Publication No. 61-163371, No. 63-79159 or No. 8-304759. That is to say, when the solar battery is used, the size, weight and thickness of the card-type display device 10A can be reduced advantageously.

It is naturally possible to use any other primary battery or a secondary battery instead of the solar battery. Also, power may be supplied to the power supply of the card-type display device 10A by electromagnetic induction while the card-type display device 10A is in contact with the electronic appliance 20. Alternatively, the power supply may also be a removable battery unit, for example.

Furthermore, a thin and small-sized fuel battery, which has recently been developed vigorously, may also be used. In that case, the entire fuel battery may be removable or just the fuel storage thereof may be removable. A fuel battery which produces hydrogen by reforming an alcohol such as methanol is particularly preferable.

In addition to, or instead of, the battery, a high-capacitance capacitor, which is normally termed an "ultra capacitor (or super capacitor)", may also be used. If the card-type display device 10A is removed from the electronic appliance for a relatively short period of time, then the display device 10A may carry out display and/or communication with only the energy that is stored in the ultra capacitor. When the ultra capacitor is used in combination with the battery, the ultra capacitor may be a backup to replace the battery.

When the card-type display device 10A is started, an inrush current having an amount exceeding a rated current may flow instantaneously. In such a situation, an excessive load may be placed on the battery of the card-type display device 10A and the life of the battery may be shortened. However, if the ultra capacitor and the battery are used in combination such that electric charge required for the inrush current is supplied from the ultra capacitor and that the load on the battery is lightened, then the battery can have an extended life.

The back surface of the card-type display device 10A may be used relatively freely although some operating members need to be present there. For that reason, the power supply circuit 14 may be mounted as a sheet battery on the back surface of the card-type display device 10A as shown in FIG. 3C. Then, the battery can have a broader area and an increased capacity.

Optionally, not only the power supply circuit 14 but also another circuit (e.g., a Bluetooth chip as the transceiver 11) may be mounted on the back surface of the card-type display device 10A. The ratio in area of the transceiver 11 to the power supply circuit 14 on the back surface of the card-type display device 10A may be determined by the battery capacity that is needed to operate the removed card-type display device 10A for a predetermined amount of time. As another alternative, the power supply circuit 14 and the transceiver 11 may be stacked one upon the other and insulated from each other.

The back surface and the principal surface (i.e., the display screen) of the card-type display device 10A may be interconnected together by providing interconnects (not shown) on a side surface of the card-type display device 10A or through holes (not shown) through the substrate 1.

As described above, the card-type display device 10A including the power supply circuit 14 can conduct a display operation even while out of contact with the electronic appliance 20. Thus, such a card-type display device 10A can be used more conveniently in broader applications. It should be noted that if the card-type display device does not include any power supply but a display section with a nonvolatile memory capability, the image that has been displayed until just before the display device is removed from the electronic appliance can still he displayed even after the display device has been removed from the electronic appliance.

Figure 4A:
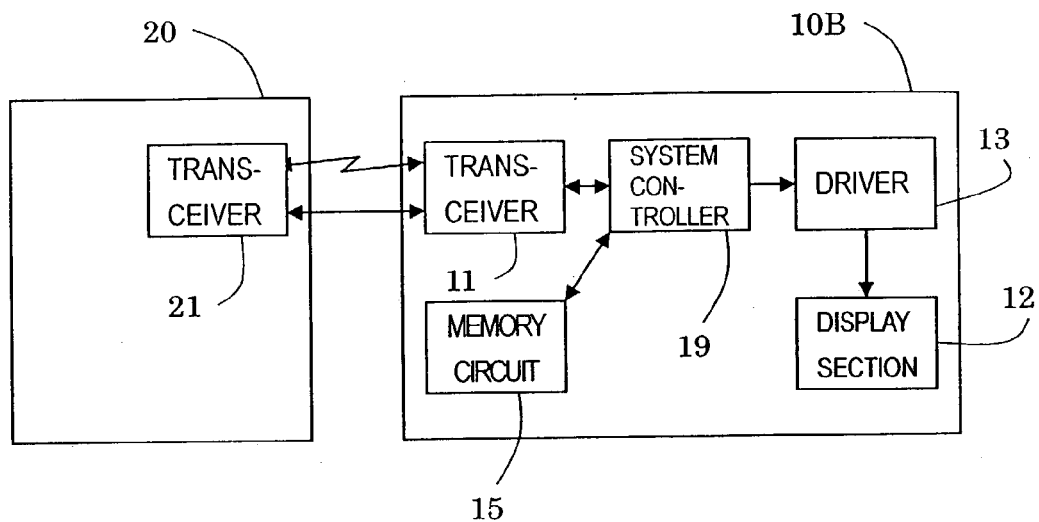
FIG. 4A is a block diagram schematically showing a state where a card-type display device 10B according to another preferred embodiment of the present invention is fitted in the electronic appliance 20.
Figure 4B:
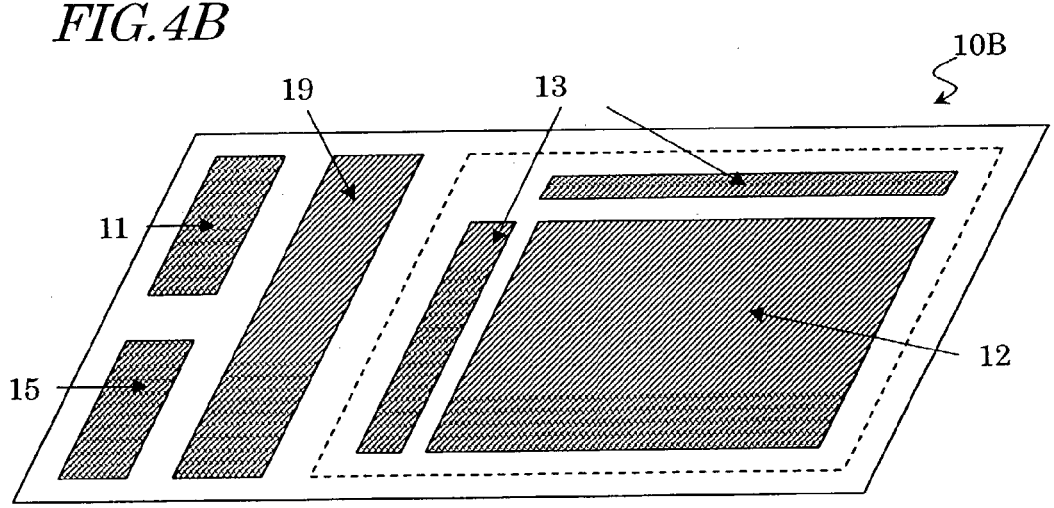
FIG. 4B schematically illustrates an exemplary layout for the card-type display device 10B.

Hereinafter, a card-type display device 10B according to another preferred embodiment of the present invention will be briefly described with reference to FIGS. 4A and 4B. As schematically shown in FIGS. 4A and 4B, the card-type display device 10B includes not only all components of the card-type display device 10 shown in FIGS. 1A and 1B but also a memory circuit 15.

The card-type display device 10B with the memory circuit 15 can be used as a sort of memory card, for example, and can provide a memory function for the electronic appliance 20 or increase the storage capacity thereof. Portion or all of the memory circuit 15 may be formed on the substrate 1. Alternatively, the memory circuit 15 may also be provided separately.

Figure 5A:
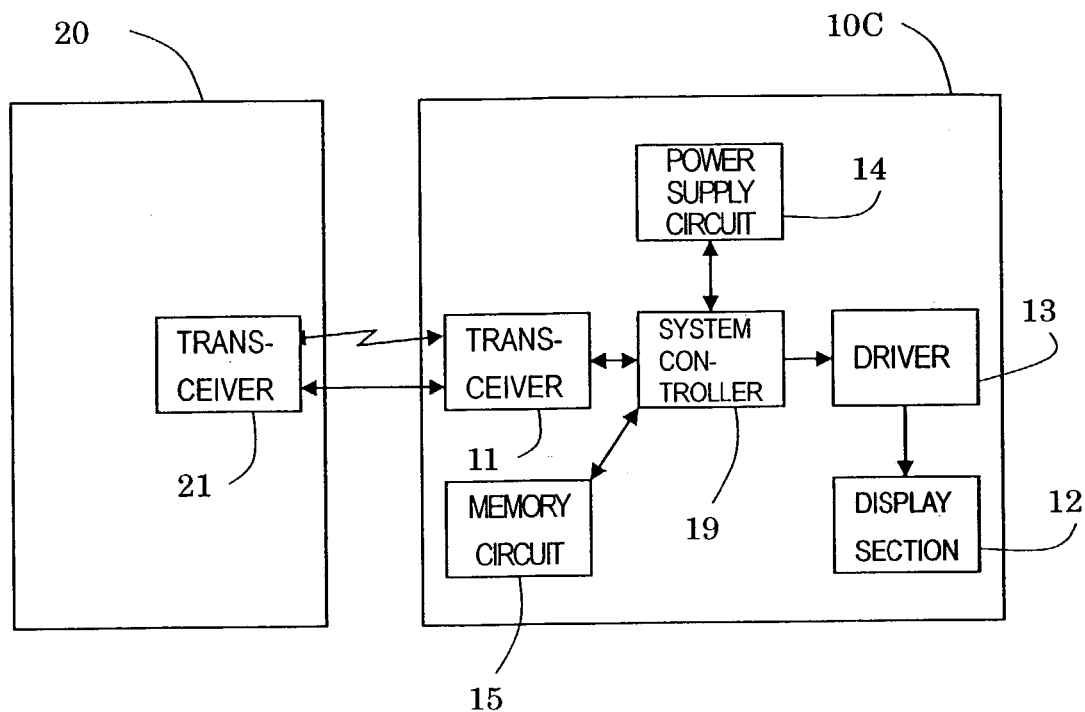
FIG. 5A is a block diagram schematically showing a state where a card-type display device 10C according to another preferred embodiment of the present invention is fitted in the electronic appliance 20.
Figure 5B:
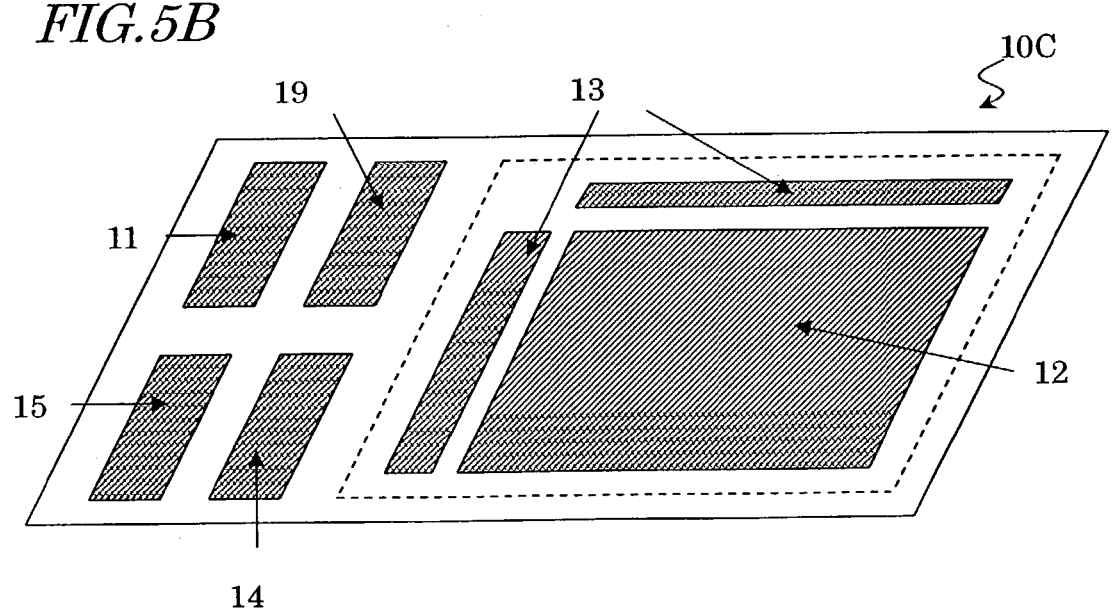
FIG. 5B schematically illustrates an exemplary layout for the card-type display device 10C.

A card-type display device 10C according to still another preferred embodiment of the present invention may include both the power supply circuit 14 and the memory circuit 15 as schematically shown in FIGS. 5A and 5B. Then, even while out of contact with the electronic appliance 20, the card-type display device 10C can still display the contents that are stored in the memory circuit 15. To check out the contents stored in any of conventional PC card type storage devices and media cards (including memory cards, memory sticks, smart media™, multimedia cards, and compact flash cards), the user needs to insert the storage device or card into an appropriate electronic appliance or at least manage them by compiling indices, for example. In contrast, the card-type display device 10C allows the user to display and check out the contents on the spot without inserting the display device 10C into any electronic appliance. Recently, the media cards have significantly increased their capacities and remarkably expanded their applications, thus making it more and more troublesome for the users to manage the media cards appropriately. Under the circumstances such as these, this card-type display device 10C should be able to provide another very convenient option for the users because the device 10C is a card-type storage device with display capabilities so to speak.

Furthermore, the memory circuit 15 may be removable from the card-type display device 10C or another removable memory circuit (not shown) may be provided separately as well. For example, if any card-type storage medium being popularized recently (e.g., media cards) is insertable into, and removable from, the card-type display device 10C, then the memory function may be added to the card-type display device 10C or the storage capacity thereof may be increased. Furthermore, by getting the contents of the media card, for example, displayed on the card-type display device 10C, the user can manage the media cards easily and just as intended. Moreover, the card-type display device 10C may have a size similar to that of a PC card, for example, and can be readily carried about with a media card. Thus, the contents of the media card can be checked out anytime on the spot.

The information to be stored in the memory circuit 15 does not have to be the information to be displayed on the card-type display device 10C but may also be the information to be used by the electronic appliance(s) 20.

Figure 6A:
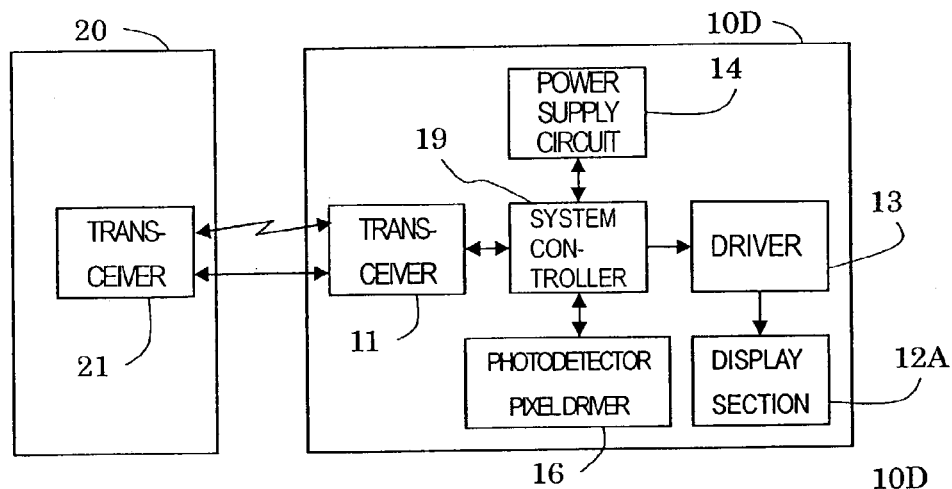
FIG. 6A is a block diagram schematically showing a state where a card-type display device 10D according to another preferred embodiment of the present invention is fitted in the electronic appliance 20.
Figure 6B:
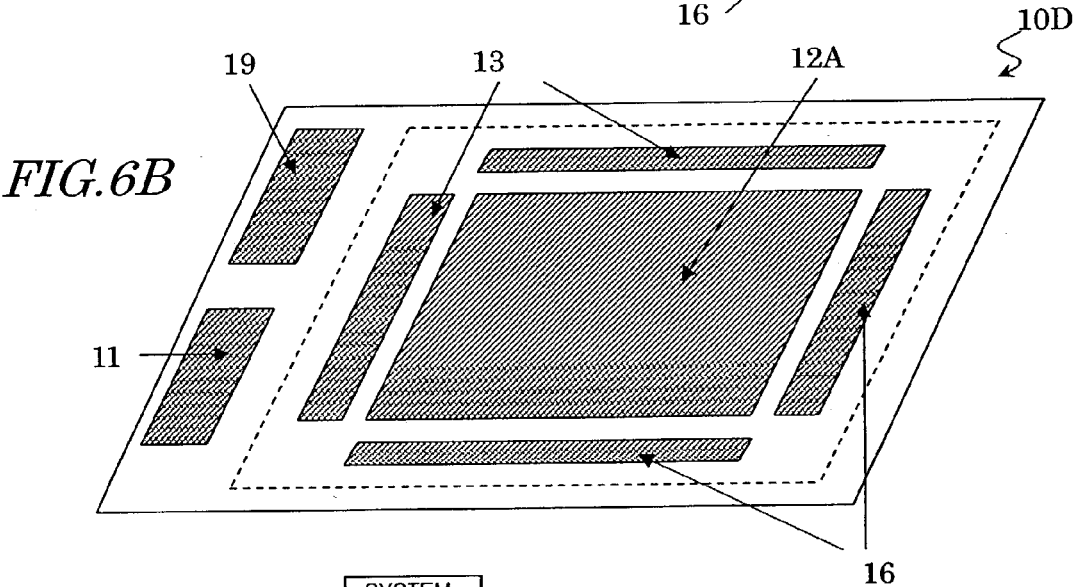
FIG. 6B schematically illustrates an exemplary layout for the card-type display device 10D.
Figure 6C:
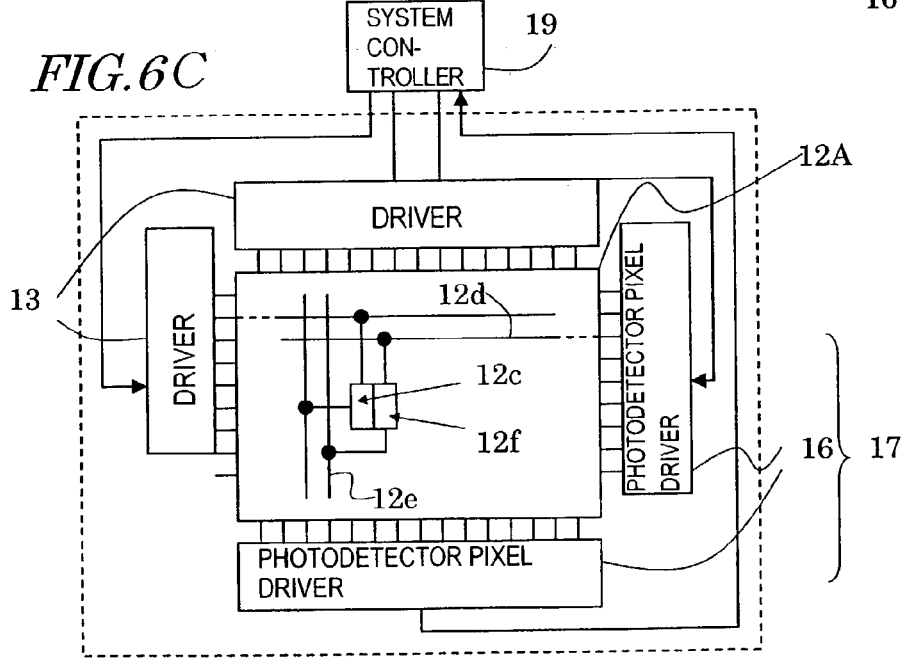
FIG. 6C schematically shows a configuration for the imager 17 thereof.

Hereinafter, a card-type display device 10D according to another preferred embodiment of the present invention will be described with reference to FIGS. 6A through 6C. As shown in FIGS. 6A through 6C, the card-type display device 10D includes an imager 17.

As schematically shown in FIG. 6C, the imager 17 includes: gate lines 12d and source lines 12e; CMOS transistors, each of which has its ON/OFF states controlled by associated one of the gate lines 12d; and photodiodes, each of which is connected to associated one of the source lines 12e by way of associated one of the CMOS transistors. Each pair of CMOS transistor and photodiode will be referred to herein as a "photodetector pixel" 12f. The imager 17 further includes a photodetector pixel driver 16 to drive the pixels 12f. Just like the display pixels 12c, the photodetector pixels 12f are also arranged in matrix. Each of those photodetector pixels 12f can receive the light that has been incident onto the display section 12A and can pick up an image. However, the imager 17 does not have to have such a configuration. For example, an imager having a configuration such as that disclosed in Japanese Laid-Open Publication No. 8-102924 may also be integrated together with the other circuits on the substrate 1.

This imager 17 may be used not just to capture an image with the display section 12A of the card-type display device 10D but to exchange data between multiple card-type display devices 10D. The imager 17 may also be provided for any of the other card-type display devices 10, 10A, 10B and 10C described above.

Figure 7A:
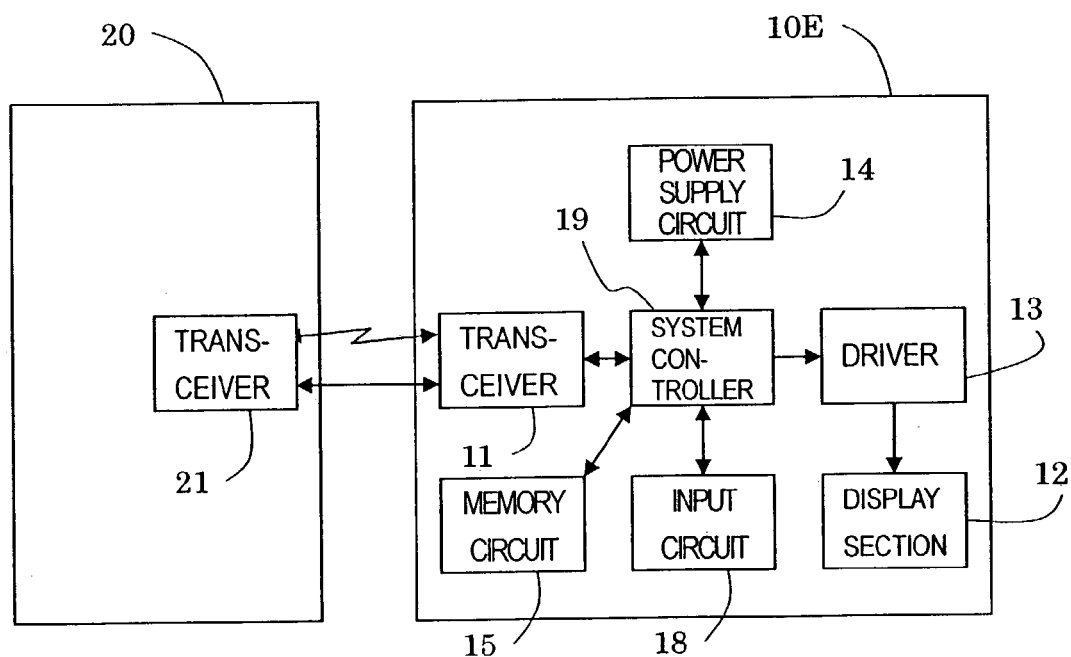
FIG. 7A is a block diagram schematically showing a state where a card-type display device 10E according to another preferred embodiment of the present invention is fitted in the electronic appliance 20.
Figure 7B:
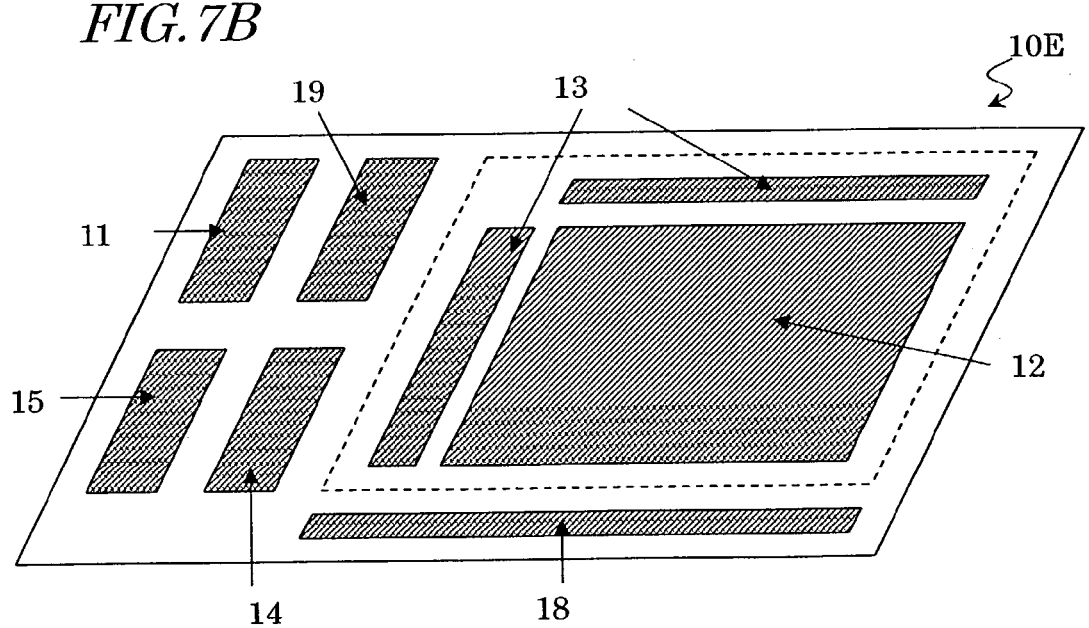
FIG. 7B schematically illustrates an exemplary layout for the card-type display device 10E.

Hereinafter, a card-type display device 10E according to another preferred embodiment of the present invention will be described with reference to FIGS. 7A and 7B. As shown in FIGS. 7A and 7B, the card-type display device 10E further includes an input circuit 18 to generate an instruction signal in response to the user's operation.

By providing the input circuit 18, the information to be displayed may be selected more easily and the modes of display may be switched more rapidly. Thus, the input circuit 18 may be used to display a broader variety of information on the card-type display device 10E. Specifically, since this card-type display device 10E includes the power supply circuit 14, the display device 1E can present various types of information thereon even while out of contact with the electronic appliance 20. Accordingly, the card-type display device 10E with the input circuit 18 is particularly convenient for the user. Portion or all of the input circuit 18 may be integrated together with the other circuits on the substrate 1. Alternatively, the input circuit 18 may also be provided separately.

The input circuit 18 preferably forms an integral part of a touchscreen because the display section 12 can have an increased area in that case.

However, the input circuit 18 does not have to be provided as an integral part of a touchscreen but may be implemented as an input section, through which a command is input in response to the user's manipulation. In that case, to increase the effective area of the display section 12 as much as possible, such an input section (not shown) is preferably provided either on the back surface of the display device 10E so as to face the display screen of the display section 12 or on a side surface of the display device 10E so as to cross the display screen. Then, the input section may be a mechanical switch or dial. For example, if a jog dial is provided as an input section on a side surface of the display device 10E so as to cross the display screen of the display section 12, then the display section 12 can have a further increased area and yet the display device 10E can be operated even more easily. Such an input section may be naturally combined with a touchscreen. Furthermore, the input section may also be provided on the same side as the display screen of the display section 12.

Hereinafter, it will be described with reference to FIG. 8 how a signal may be exchanged between the card-type display device 10F and the electronic appliance 20 in a preferred embodiment of the present invention. The following statement is true of any of the various card-type display devices 10 and 10A through 10E described above. Thus, the card-type display device 10F represents each of the card-type display devices 10 and 10A through 10E described above.

Figure 8:
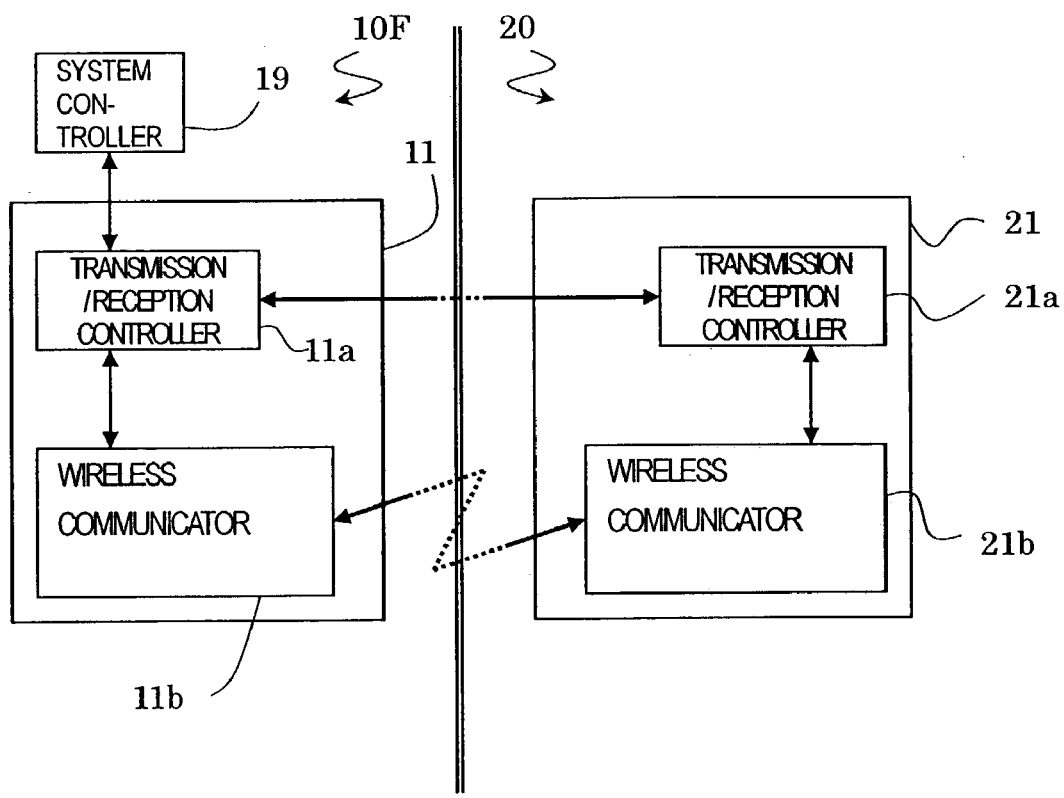
FIG. 8 is a block diagram schematically showing how the card-type display device 10F exchanges signals with the electronic appliance 20.

As shown in FIG. 8, the transceiver 11 of the card-type display device 10F includes a transmission/reception controller 11a and a wireless communicator 11b. Likewise, the electronic appliance 20, to which the card-type display device 10F may be inserted, also includes a transmission/reception controller 21a and a wireless communicator 21b. By exchanging signals between these wireless communicators 11b and 21b, the signal can be transmitted to, or received from, the electronic appliance 20 by a non-contact method. If the card-type display device 10F has no power supply, the signals should be exchanged while the card-type display device 10F is in contact with the electronic appliance 20. However, if the card-type display device 10F has a power supply, the signals may be exchanged even if the card-type display device 10F is out of contact with the electronic appliance 20.

In this manner, if signals can be exchanged by such a non-contact method, the card-type display device 10F will not be broken or damaged easily even when the substrate 1 thereof is made of glass, for example. This is because the signals can be exchanged with no mechanical force applied onto the substrate 1.

Optical communication may be carried out as infrared communication when IrDA-compatible infrared communications devices (e.g., optical communications devices including an LED and a photodetector within a single housing and compatible with 1.1 M infrared communication) are used as the wireless communicators 11b and 21b. Alternatively, short-range radio communication may also be carried out by using Bluetooth modules (radio communications devices) as the wireless communicators 11b and 21b. Also, when the optical communication is carried out, the optical communications devices may be provided on the principal surface of the substrate 1 (e.g., a glass substrate) so as to propagate an optical signal vertically to the substrate 1.

Furthermore, the card-type display device 10F may be further provided with a contact sensor (not shown). In that case, the card-type display device 10F and/or the electronic appliance 20 may switch their modes of operation depending on whether the card-type display device 10F is in or out of contact with the electronic appliance 20. For example, the modes of communication may be switched as follows depending on whether the card-type display device 10F is in or out of contact with the electronic appliance 20.

If the contact sensor, provided for the transceiver 11 or system controller 19 of the card-type display device 10F, has sensed that the card-type display device 10F is in contact with the electronic appliance 20, optical communication may be carried out between the card-type display device 10F and electronic appliance 20 by exchanging optical signals between optical communications devices. On the other hand, if the contact sensor has sensed that the card-type display device 10F is out of contact with the electronic appliance 20, radio communication may be carried out between the card-type display device 10F and the electronic appliance 20 by exchanging radio frequency signals between radio communications devices. The modes of communication to be switched are not limited to the optical communication and radio communication described above. For example, modes of communication may also be switched between short-range optical communication and long-range optical communication, between short-range radio communication and long-range radio communication and between electrically connected, wired communication and optical communication or wireless communication (e.g., radio communication).

Furthermore, the output levels of communication signals such as optical or radio frequency signals may also be changed depending on whether the card-type display device 10F is in or out of contact with the electronic appliance 20. For example, while the card-type display device 10F is out of contact with the electronic appliance 20, the communication between them should be carried out over a certain distance, and therefore, output signals having relatively high levels may be transmitted. On the other hand, while the card-type display device 10F is in contact with the electronic appliance 20, output signals having relatively low levels may be transmitted. Then, the power dissipation can be reduced while the card-type display device 10F is in contact with the electronic appliance 20.

In the preferred embodiment described above, the contact sensor is provided for the card-type display device 10F. Alternatively, the contact sensor may also be provided for the electronic appliance 20 such that a signal indicating that the electronic appliance 20 is in or out of contact with the card-type display device 10F may be transmitted to the card-type display device 10F. It should be noted that the contact sensor and a circuit for switching the modes of operation in accordance with the results obtained by the contact sensor may be easily implemented with known circuits.

If the card-type display device 10F has a power supply, information can be exchanged between the card-type display device 10F and the electronic appliance 20 by optical communication or radio communication. Accordingly, the card-type display device 10F may transmit a signal to control some functions of the electronic appliance 20. That is to say, the card-type display device 10F may have the ability to perform remote control over the electronic appliance 20. For example, if the electronic appliance 20 is a camera or a TV, the user can operate the electronic appliance 20 while watching an image on the card-type display device 10F. Then, the user can control the electronic appliance 20 even more easily. Examples of such operations include shuttering operation of cameras and channel switching operation of TVs.

Hereinafter, electronic appliances 20 according to the present invention will be described in further detail by way of specific examples.

Figure 9A:
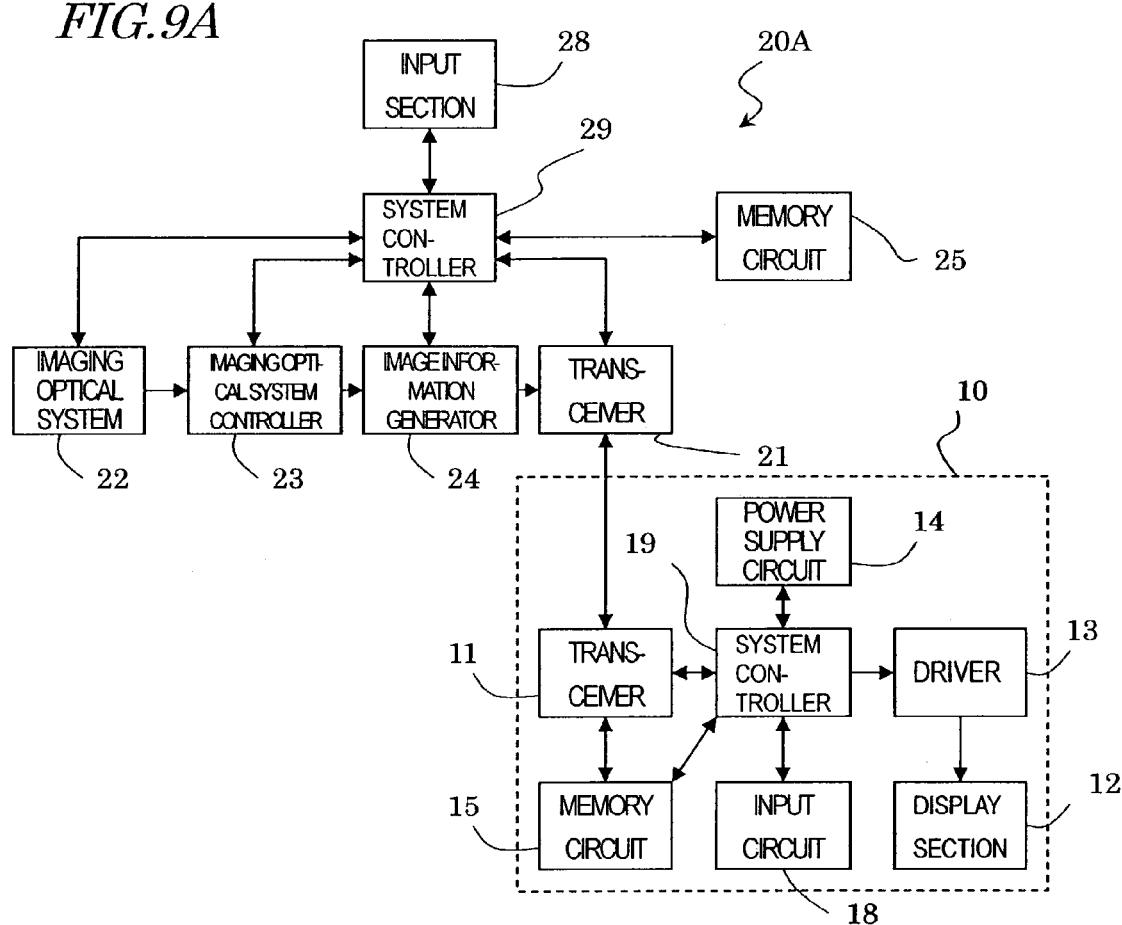
FIG. 9A is a block diagram schematically showing a configuration for a digital still camera 20A as an exemplary electronic appliance to which the card-type display device 10 according to the preferred embodiment of the present invention is inserted.
Figure 9B:
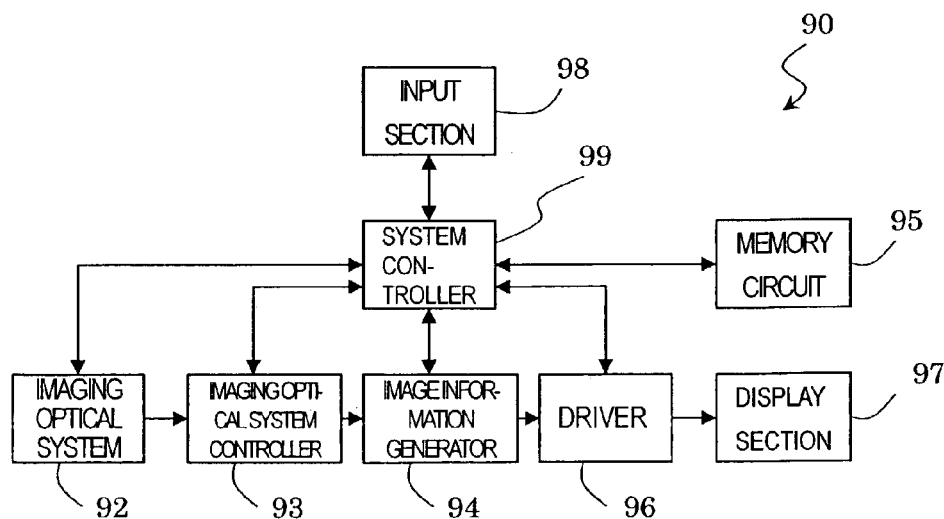
FIG. 9B is a block diagram schematically showing a configuration for a conventional digital still camera 90.

FIG. 9A schematically shows a configuration for a digital still camera 20A as an exemplary electronic appliance according to the present invention. In the example illustrated in FIG. 9A, the card-type display device 10 is supposed to be the card-type display device 10E shown in FIGS. 7A and 7B. However, the card-type display device 10 may also be any of the other devices 10, 10A, 10B, 10C and 10D described above although some functions are just added thereto or deleted therefrom. FIG. 9B schematically shows a configuration for a conventional digital still camera 90 as a comparative example.

First, the configuration of the conventional camera 90 will be described. As shown in FIG. 9B, the conventional camera 90 includes: an imaging optical system 92; an imaging optical system controller 93 to control the imaging optical system 92; an image information generator 94 to generate image information based on the optical information that has been obtained from the imaging optical system 92; a driver 96 to produce a display signal based on the image information that has been generated by the image information generator 94 and a drive signal for a display section 97; a system controller 99 to perform control over these circuits; and an input section 98 to allow the user to input his or her command. The camera 90 further includes a memory circuit 95 to store the image information that has been generated by the image information generator 94. A media card may be used as portion or all of the memory circuit 95.

In the conventional camera 90, while watching the object through a viewfinder (included in the imaging optical system 92) or an image being presented on the display section 97, the user adjusts the photographing conditions, including selection of objects, angles and magnification power, before taking a picture. The image information captured in this manner is once stored in the memory circuit 95 and then transferred to a PC (not shown), which is connected to the camera 90 via a connector cable. If the memory circuit 95 is a media card, the image information is transferred to the PC with the memory circuit 95 inserted into the slot of the PC.

In the conventional camera 90, if the user wants to watch an image that is stored in the memory circuit 95, then the image should be presented on the display section 97 of the camera 90. While the image is being presented on the display section 97, the user cannot take any picture with the camera 90. Also, if the user has a number of media cards, it would be troublesome for him or her to manage them as described above.

In contrast, by using the card-type display device 10 according to the preferred embodiment of the present invention and the camera 20A to which the card-type display device 10 is inserted, the user can take a picture with the camera 20A while watching a recorded image on the card-type display device 10. In addition, the user can manage the stored image information easily and just as intended.

As shown in FIG. 9A, the camera 20A according to the preferred embodiment of the present invention includes: an imaging optical system 22; an imaging optical system controller 23 to control the imaging optical system 22; an image information generator 24 to generate image information based on the optical information that has been obtained from the imaging optical system 22; a transceiver 21 to generate and output a display signal based on the image information that has been generated by the image information generator 24; a system controller 29 to control the imaging optical system 22, imaging optical system controller 23, image information generator 24 and transceiver 21; and a housing (not shown) to store these circuits. It should be noted that the imaging optical system controller 23 may be included in the system controller 29.

The card-type display device 10 is fitted into, but removable from, the housing of the camera 20A. As shown in FIG. 9A, the card-type display device 10 includes: the display section 12; the transceiver 11 to transmit or receive a signal to/from the transceiver 21; the driver 13 to drive the display section 12 in accordance with the display signal; and the system controller 19 to control the transceiver 11 and driver 13.

In the preferred embodiment shown in FIG. 9A, the camera 20A includes a memory circuit 25 to store the image information thereon. But the memory circuit 25 may be omitted from the camera 20A or provided for the card-type display device 10 instead. Also, although the camera 20A and the card-type display device 10 are regarded herein as separate components, the combination of camera 20A and card-type display device 10 may also be regarded as a camera with a removable display.

The card-type display device 10 has the functions that have already been described with reference to FIGS. 7A and 7B. Accordingly, by exchanging signals between the card-type display device 10 and the camera 20A, the user can use the card-type display device 10 in various manners.

Next, it will be described with reference to FIG. 10 how the camera 20A and the card-type display device 10 may be used.

The image information that has been captured by the camera 20A may be once stored in the memory circuit 15 and then presented on the card-type display device 10 that has been removed from the camera 20A. Accordingly, although the viewfinder included in the imaging optical system 22 also needs to be used to take another picture, the user can check out the contents of the recorded image information on the card-type display device 10 and take another picture with the camera 20A concurrently.

Figure 10:
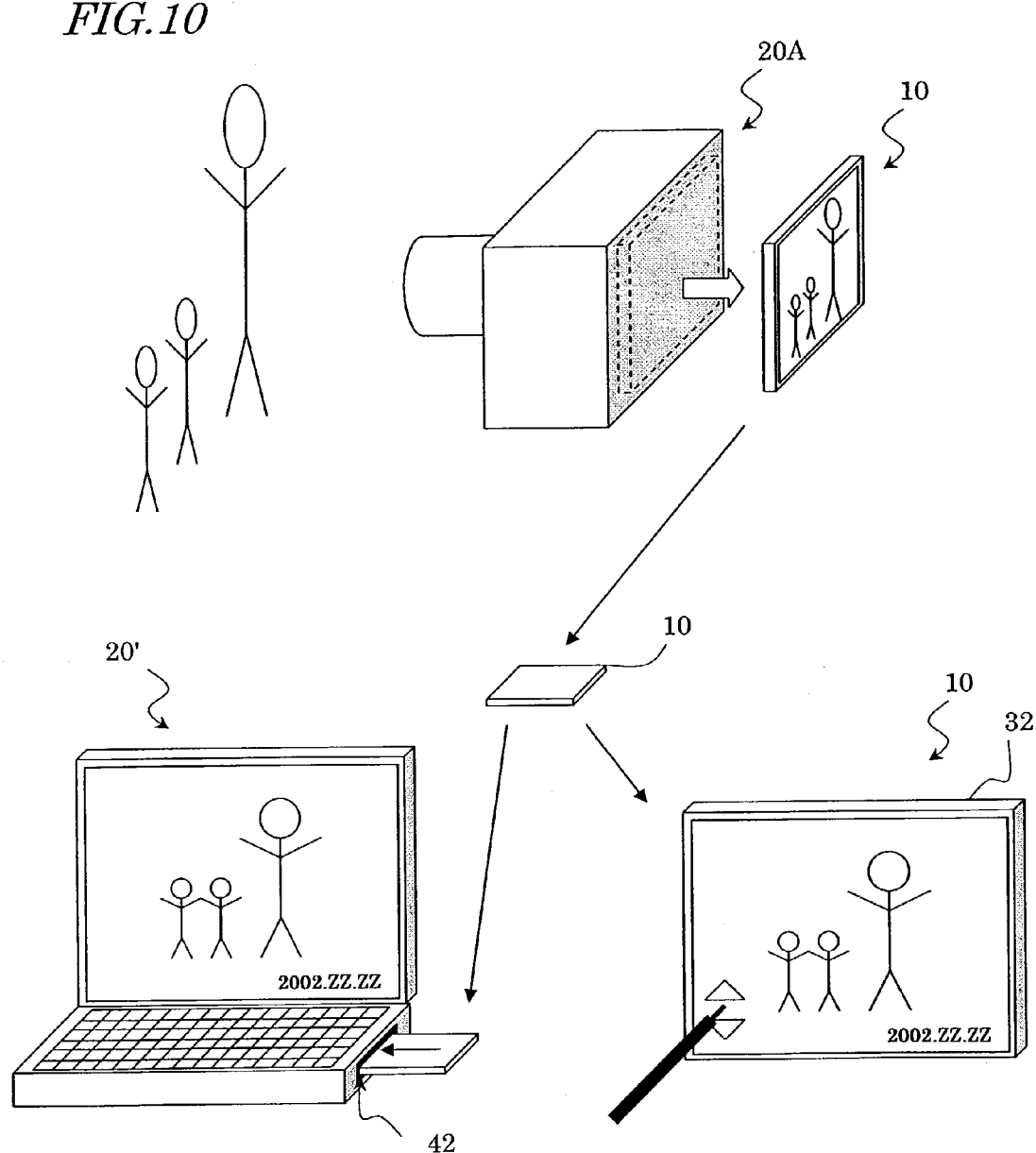
FIG. 10 schematically shows how the card-type display device 10 may be used with or without the digital still camera 20A shown in FIG. 9A.

As also shown in FIG. 10, if the card-type display device 10 is inserted into the slot 42 of another electronic appliance (e.g., a PC) 20', then the image information that is stored in the memory circuit 15 of the card-type display device 10 can be transferred to the electronic appliance 20'. Naturally, the image data that has been processed or edited by the electronic appliance 20' may also be stored in the memory circuit 15 of the card-type display device 10 and then presented on the card-type display device 10.

Furthermore, if the card-type display device 10 has an input circuit as an integral part of a touchscreen, for example, then the user can select the image information to be displayed, switch the modes of display, change the magnification powers, or display thumbnails even while the card-type display device 10 is out of contact with the camera 20A or the PC 20'.

Optionally, an image processor may be provided for the system controller 29 of the camera 20A. In that case, when the image information to be displayed on the card-type display device 10 is selected, the image processor can determine whether or not a registered feature is included in the image that is going to be displayed. If the answer is YES, the image processor can extract the feature and automatically select the best display settings for the feature. For example, when a souvenir picture or portrait is about to be displayed, the image processor may extract a human face as a feature, find the best hue and/or brightness settings, and perform color and/or brightness correction on the overall image to be displayed based on the settings such that the human face will be displayed in a hue falling within the desired color range. Such image processing may be carried out by using any known circuit.

Figure 11A:
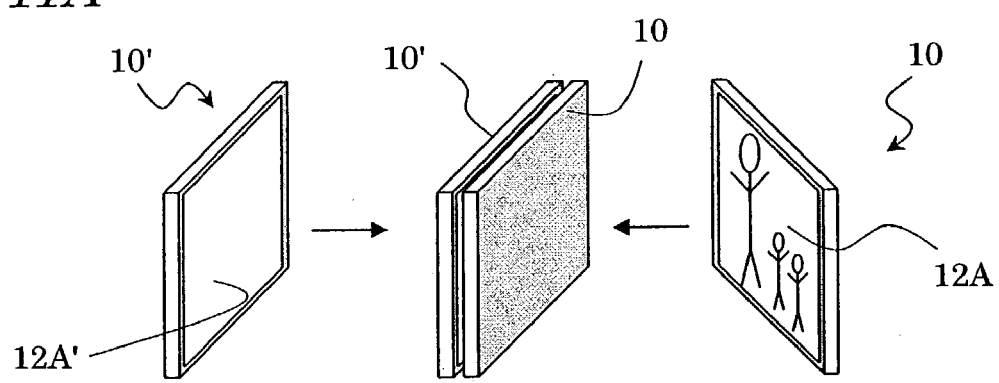
FIGS. 11A and 11B schematically show how the card-type display device 10 shown in FIG. 9A may be used in another application.
Figure 11B:
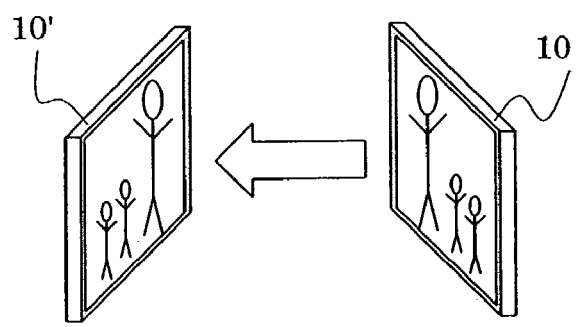

Furthermore, if the card-type display device 10 has an imager as in the card-type display device 10D shown in FIGS. 6A through 6C, then the card-type display device 10 may be used as shown in FIGS. 11A and 11B. Specifically, two card-type display devices 10 and 10' are prepared as shown in FIG. 11A. In this case, while a recorded image is being presented on one card-type display device 10, the display screen of the card-type display device 10 and that of the other card-type display device 10' may be brought into contact with each other such that the image is transferred from the former display device 10 to the latter display device 10' by using the imager of the display device 10' as shown in FIG. 11B. Such an image information transfer method can be carried out not just between multiple card-type display devices 10 but between an electronic appliance and the card-type display device 10.

Next, a TV 20B as another exemplary electronic appliance according to the present invention will be described with reference to FIG. 12.

Figure 12:
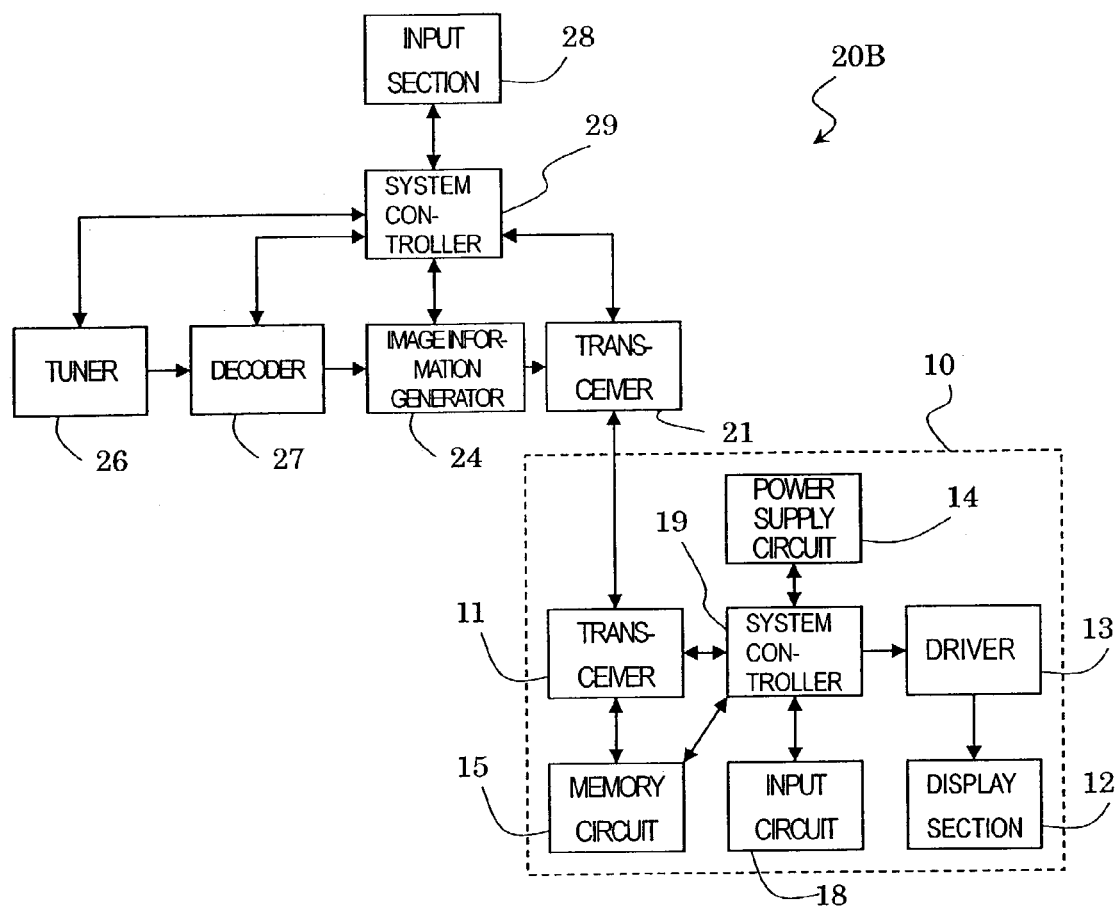
FIG. 12 is a block diagram schematically showing a configuration for a TV 20B as another exemplary electronic appliance to which the card-type display device 10 according to the preferred embodiment of the present invention is inserted.

As shown in FIG. 12, the TV 20B includes: a tuner 26; a decoder 27 to decode the output signal of the tuner 26; the image information generator 24 to generate image information based on the decoded signal; and the transceiver 21 to generate and output a display signal based on the image information that has been generated by the image information generator 24. The display signal that has been transmitted from the transceiver 21 of the TV 20B may be received at the transceiver 11 of the card-type display device 10. In response to the display signal, the card-type display device 10 can conduct a display operation. The TV 20B may include a member to receive the card-type display device 10 and may use the card-type display device 10 as a main (or only) display device. Alternatively, the TV 20B may include another display device (not shown) as its main display device and may use the card-type display device 10 as an additional display device. That is to say, the TV 20B may function as a display device by itself. Also, the card-type display device 10 shown in FIG. 12 may be the same as the card-type display device 10 to be inserted into the camera 20A shown in FIG. 9A.

Figure 13:
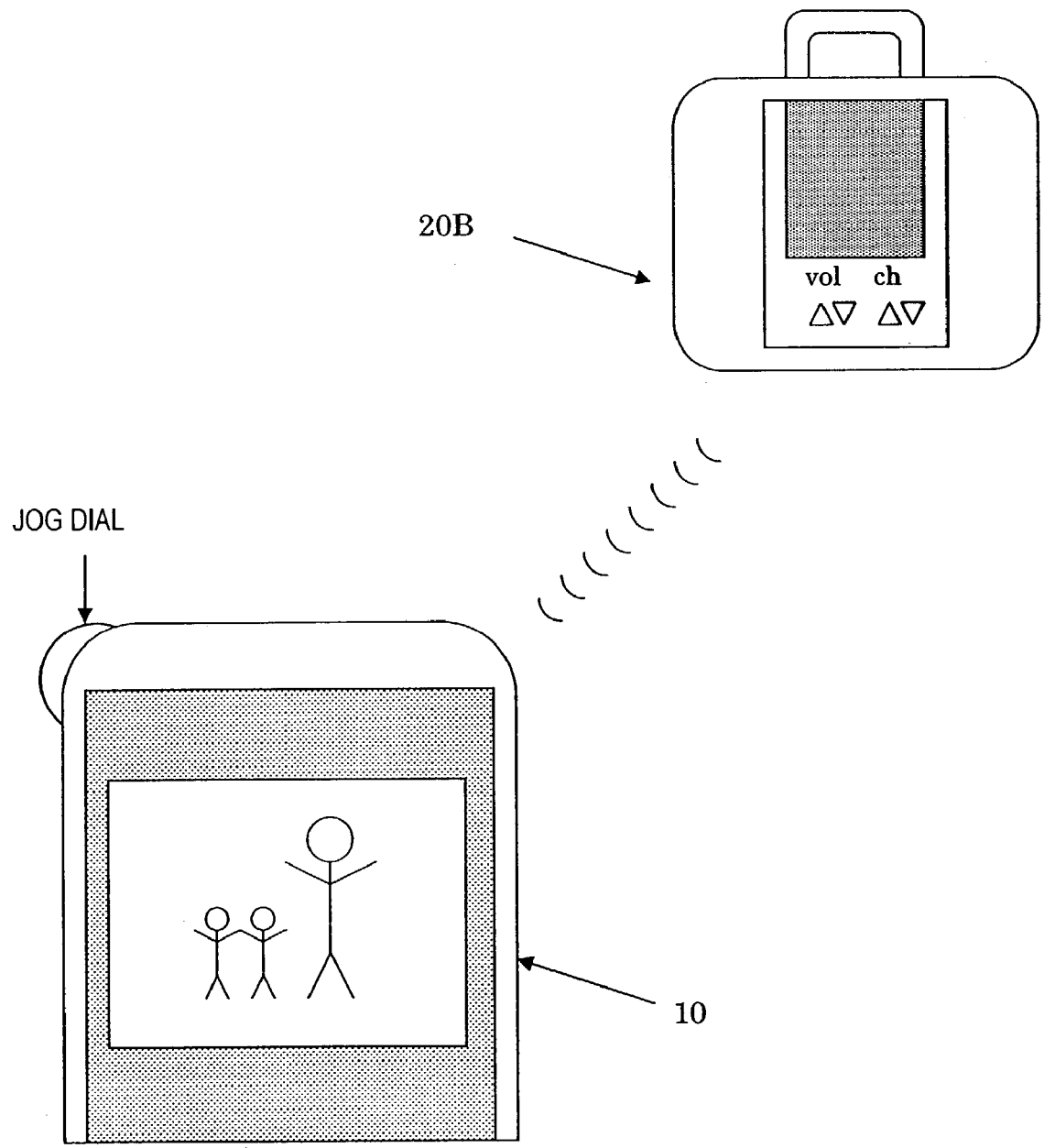
FIG. 13 schematically shows how the card-type display device 10 according to the preferred embodiment of the present invention may be used while it is out of contact with the TV 20B shown in FIG. 12.

Furthermore, if the card-type display device 10 includes a power supply, then information can be exchanged between the card-type display device 10 and the TV 20B by either optical communication or radio communication. For example, if the user keeps the card-type display device 10 at hand with the TV 20B stored in his or her bag as schematically shown in FIG. 13, the user can watch TV programs on the card-type display device 10 by getting televised video information transmitted from the TV 20B to the card-type display device 10 by radio communication, for instance. The user can also perform remote controls (e.g., change channels) over the TV 20B by transmitting control information from the card-type display device 10 to the TV 20B in the bag. It should be noted that the information to be exchanged between the TV 20B and the card-type display device 10 includes not just televised video information but also graphics and various other types of data (e.g., time tables, schedules and phone numbers). Also, the TV 20B may also be a multimedia appliance having data processing and calculating capabilities.

Next, a PDA 20C as another exemplary electronic appliance according to the present invention will be described with reference to FIGS. 14, 15A and 15B.

Figure 14:
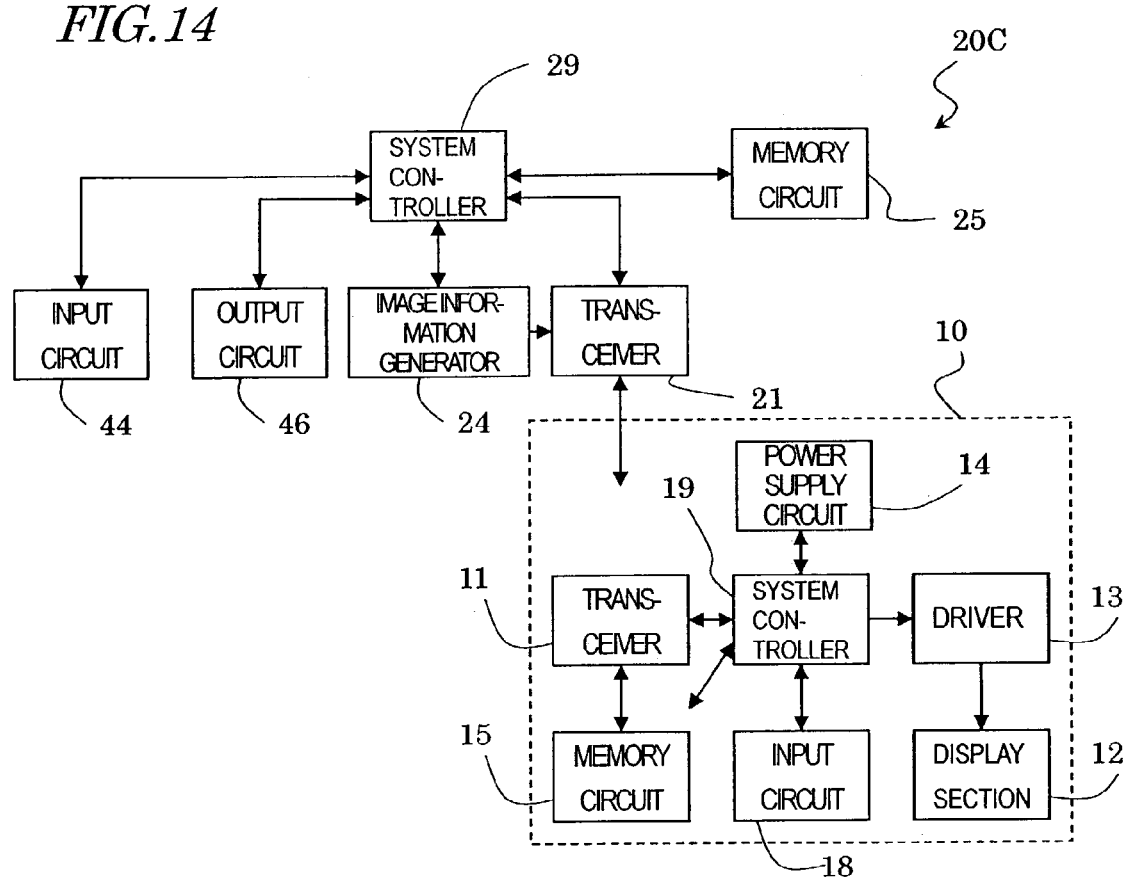
FIG. 14 is a block diagram schematically showing a configuration for a PDA 20C as another exemplary electronic appliance to which the card-type display device 10 according to the preferred embodiment of the present invention is inserted.

FIG. 14 schematically shows a configuration for the PDA 20C and the card-type display device 10. FIG. 15A schematically shows a state where the card-type display device 10 is fitted in the PDA 20C. FIG. 15B schematically shows the card-type display device 10 that has been removed from the PDA 20C.

As shown in FIG. 14, the PDA 20C includes: an input circuit 44; an output circuit 46; the image information generator 24 to generate image information based on the information that has been provided from the input circuit 44; and the transceiver 21 to generate and output a display signal based on the image information that has been generated by the image information generator 24. The PDA 20C further includes a memory circuit 25 to store the image information and other types of information therein. The PDA 20C may be used as a PDA by itself.

Figures 15A, 15B:
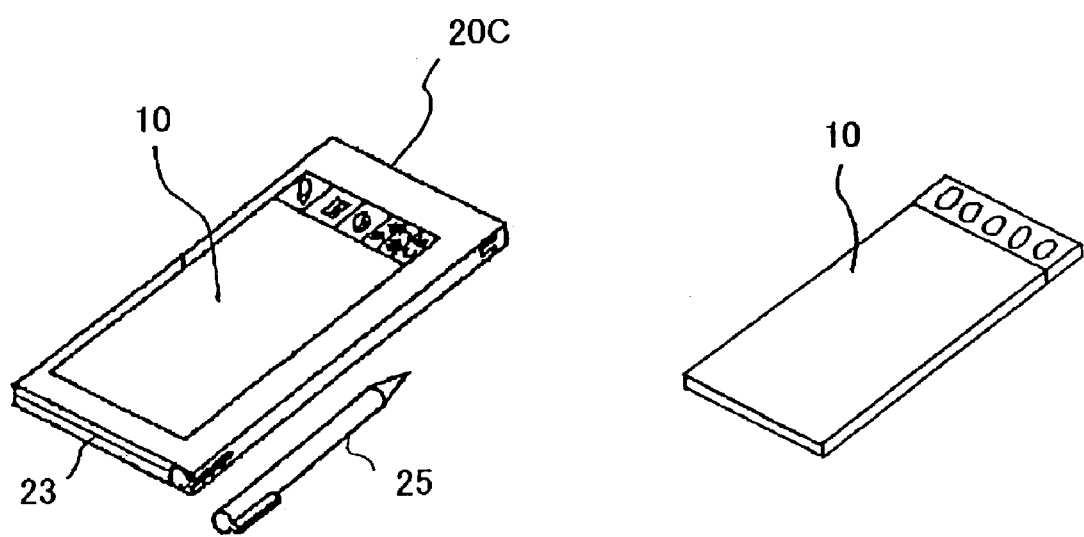
FIG. 15A is a perspective view schematically illustrating a state where the card-type display device 10 is fitted in the PDA 20C.
FIG. 15B is a perspective view schematically illustrating the card-type display device 10 that has been removed from the PDA 20C.

As shown in FIG. 15A, the PDA 20C has a hole 23 on the bottom such that the card-type display device 10 can be inserted into, and removed from, the PDA 20C through that hole 23. After having been inserted into the hole 23, the card-type display device 10 is guided to the slot of the PDA 20C, held with the display section 12 facing the user, and then fixed at a location where signals can be exchanged between the transceiver 21 of the PDA 20C and the transceiver 11 of the card-type display device 10. Although not shown in FIG. 15A, an eject lever for use to remove the card-type display device 10 is provided on a side surface of the PDA 20C.

The input circuit 18 is provided as an integral part of a touchscreen in the display section 12 of the card-type display device 10 so as to allow the user to input a command with a pen 25 or a finger. The user can input a command to the card-type display device 10 no matter whether the card-type display device 10 is fitted in, or removed from, the PDA 20C. When the card-type display device 10 is fitted in the PDA 20C, some commands for the PDA 20C may be input through the display section 12 of the card-type display device 10. On the other hand, when the card-type display device 10 is used separately, the user can input any of various commands such as switching, selecting, enlarging or shrinking, and thumbnailing the images that are stored in the memory circuit 15.

Since the card-type display device 10 is easily removable from the PDA 20C, the small size and light weight of the card-type display device 10 can be made full use of. For example, the user can carry about the card-type display device 10 in which only necessary information (e.g., map, picture or other image information and schedule or other character information) is stored. Particularly when the user moves between two locations that are equipped with the PDA 20C or any other electronic appliance to which the card-type display device 10 is connectable, the user needs to carry about just his or her necessary information. Thus, the user can take advantage of the portability of the card-type display device 10, which is even smaller in size and lighter in weight than the PDA 20C.

The card-type display device is naturally applicable for use in not just PDAs but cell phones as well. Even so, the cell phone and the card-type display device can also operate independently of each other. Furthermore, the card-type display device can also be used in game appliances and car navigation systems.

Various preferred embodiments of the present invention described above mainly relate to the display of image information. However, the information to be displayed on the card-type display device 10 does not have to be image information but may also be character information, for example. Data, commands and other information for use to control the electronic appliance 20, to which the card-type display device 10 is inserted, may also be displayed on the card-type display device 10.

The preferred embodiments of the present invention described above relate to a card-type display device and an electronic appliance compatible with such a device. However, the present invention is in no way limited to a display device with any particular size or shape but may be implemented as any display device to be insertable into, and removable from, an electronic appliance. For example, a sheet-type display device having a screen of an approximately A4 size may be used not just as a display device for a TV but also as a data display device or a display device for an electronic notebook with pen input device or an electronic magazine. Furthermore, if the sizes of those display devices are adjusted to standard paper sizes including A4, B5, A5 and B6, then the compatibility of the display devices would increase and/or the manufacturing cost thereof would decrease. Also, the display devices preferably have a reduced thickness because it would be easier to popularize those display devices as media to replace traditional paper sheets.

Various preferred embodiments of the present invention described above provide a display device that can be selectively connected to, and add display capabilities to, any electronic appliance on demand of the user and also provide an electronic appliance compatible with such a display device. A display device according to any of the preferred embodiments described above can provide main or additional display capabilities for any conventional electronic appliance or unit just like a storage device (e.g., a PC card) with display capabilities. Among other things, a card-type display device according to a preferred embodiment of the present invention can be easily inserted to, and removed from, an electronic appliance and readily carried about, thus providing a highly convenient tool for users.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A display device which defines an attached state or a removed state with respect to an electronic appliance, the display device comprising:
   a display section;
   a driver for driving the display section;
   a transceiver for transmitting and receiving a signal to/from the electronic appliance;
   a system controller for controlling the driver and the transceiver; and
   a power supply;
   wherein the display device has the ability to conduct a display operation by itself even when the display devices is in the removed state with respect to the electronic appliance,
   wherein at least portion of the transceiver and at least portion of the system controller are integrated together with the display section and the driver on the same substrate.

2. The display device of claim 1, wherein the display device is substantially in the shape of a rectangle in a plan view, and a portion of the display device, including one side of the rectangle, is inserted into a member of the electronic appliance that receives the display device in a removable state.

3. The display device of claim 1, wherein the power supply is attachable to, and removable from, the display device.

4. The display device of claim 1, wherein the power supply includes a solar battery.

5. The display device of claim 1, wherein the power supply includes a fuel battery.

6. The display device of claim 1, wherein power is supplied to the power supply by electromagnetic induction while the display device is in the attached state with respect to the electronic appliance.

7. The display device of claim 1, further comprising a memory.

8. The display device of claim 7, wherein the memory is attachable to, and removable from, the display device.

9. The display device of claim 1, further comprising an imager.

10. The display device of claim 1, further comprising an input circuit, which generates an instruction signal in response to user's operation.

11. The display device of claim 10, further comprising an input section, through which a command is input by user's manipulation.

12. The display device of claim 11, wherein the input section is provided either on a surface of the display device so as to face a screen of the display section or on a side surface of the display device so as to cross the screen.

13. The display device of claim 11, wherein the input section includes a jog dial.

14. The display device of claim 1, further comprising at least one circuit that is selected from the group consisting of a memory, an input circuit, and an imager, wherein a portion of the at least one circuit is integrated together with the other circuits on the substrate.

15. The display device of claim 1, wherein the at least portion of the transceiver and the at least portion of the system controller each include a circuit component that is made of the same film as a circuit component of the display section or the driver.

16. The display device of claim 15, wherein the same film is a continuous grain silicon film.

17. The display device of claim 1, wherein in the attached state, the display device transmits or receives the signal to/from the electronic appliance by a non-contact method.

18. The display device of claim 1, wherein the display device transmits or receives the signal to/from the electronic appliance by a radio communication technique.

19. The display device of claim 1, wherein the display device transmits or receives the signal to/from the electronic appliance by an optical communication technique.

20. The display device of claim 19, wherein the optical communication is carried out by an element that is provided on the substrate so as to propagate an optical signal vertically to the substrate.

21. A display device which defines an attached state or a removed state with respect to an electronic appliance, the display device comprising:

a display section;

a driver for driving the display section;

a transceiver for transmitting or receiving a signal to/from the electronic appliance; and a system controller for controlling the driver and the transceiver, wherein at least portion of the transceiver and at least portion of the system controller are integrated together with the display section and the driver on the same substrate, wherein the display device has the ability to switch communications modes of transmitting or receiving the signal to/from the electronic appliance depending on whether the display device defines the attached state or the removed state with respect to the electronic appliance.

22. The display device of claim 21, wherein switching of the communication modes include switching between an optical communication mode and a radio communication mode.

23. The display device of claim 21, wherein switching of the communication modes includes changing output levels of the signal to be exchanged.

24. The display device of claim 1, wherein the display device has the ability to transmit a signal that controls some functions of the electronic appliance.

* * * * *